United States Patent
Azizan et al.

(10) Patent No.: US 11,088,531 B2
(45) Date of Patent: Aug. 10, 2021

(54) DEVICE, BATTERY AND METHOD FOR SPARK DETECTION BASED ON TRANSIENT CURRENTS

(71) Applicant: MOTOROLA SOLUTIONS, INC., Chicago, IL (US)

(72) Inventors: Muhamad Ridzuan Azizan, Baling (MY); Macwien Krishnamurhti, Shah Alam (MY); Kow Chee Chong, Bayan Lepas (MY); Chen Kok Yeoh, Bukit Mertajam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 81 days.

(21) Appl. No.: 16/563,424

(22) Filed: Sep. 6, 2019

(65) Prior Publication Data
US 2021/0075206 A1 Mar. 11, 2021

(51) Int. Cl.
*H02H 3/093* (2006.01)
*H02H 3/05* (2006.01)
*H02H 7/18* (2006.01)

(52) U.S. Cl.
CPC ............. *H02H 3/093* (2013.01); *H02H 3/05* (2013.01); *H02H 7/18* (2013.01)

(58) Field of Classification Search
CPC .......... H02H 3/021; H02H 3/027; H02H 3/05; H02H 3/08; H02H 3/087; H02H 3/093; H02H 7/18
See application file for complete search history.

(56) References Cited

U.S. PATENT DOCUMENTS

| | | | |
|---|---|---|---|
| 4,638,396 A | 1/1987 | Mukli et al. | |
| 6,831,447 B1 | 12/2004 | Wittenberg | |
| 7,068,012 B1 | 6/2006 | Geren et al. | |
| 7,408,755 B1* | 8/2008 | Ye | H02H 3/025 361/93.1 |
| 2005/0127878 A1* | 6/2005 | Geren | H02J 7/0031 320/134 |
| 2005/0285572 A1* | 12/2005 | Geren | H02J 7/0029 320/134 |
| 2006/0232244 A1* | 10/2006 | Vieira Formenti | H02J 7/027 320/128 |
| 2012/0043967 A1* | 2/2012 | Miura | H02H 7/18 324/426 |
| 2016/0380451 A1* | 12/2016 | Pan | H02J 7/0031 320/136 |
| 2018/0152785 A1* | 5/2018 | Yeoh | H03F 1/0216 |
| 2019/0128929 A1* | 5/2019 | Hashimoto | G01R 19/165 |

* cited by examiner

*Primary Examiner* — Fred E Finch, III
(74) *Attorney, Agent, or Firm* — Perry + Currier, Inc.

(57) ABSTRACT

A device, battery and method for spark detection based on transient currents is provided. The battery includes: a cell; an interface; a first protection circuit and a second protection circuit. The first protection circuit comprises a first switch between the cell and the interface. The second protection circuit comprises a second switch between the cell and the interface. The first protection circuit is configured to: measure a load current on the cell; and open the first switch according to a first delay time based on the measurement of the load current. The second protection circuit is configured to: measure a transient current on the cell above the load current; and open the second switch according to a second delay time, lower than the first delay time, based on the measurement of the transient current.

16 Claims, 7 Drawing Sheets

DEVICE, BATTERY AND METHOD FOR SPARK DETECTION BASED ON TRANSIENT CURRENTS

BACKGROUND OF THE INVENTION

Battery-powered devices may include circuits and/or electronics which draw current from a battery; sudden peaks in the current may cause sparking, which can be dangerous, especially when the battery-powered device is used in a hazardous location.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Battery-powered devices may include circuits and/or electronics which draw current from a battery; any unprotected portion of the circuits and/or electronics may potentially result in sudden peaks in the current may cause sparking, which can be dangerous, especially when the battery-powered device is used in a hazardous location. Hence, many battery-powered devices used in hazardous environments, such as HAZLOC (hazardous location) radios, have a specification that load current may not exceed a given threshold load current. However, transient currents which may not correspond to sparks, may cause a spark protection circuit and/or a load protection circuit to trip, thereby disabling the device. For example, load protection circuits generally measure a total current (including the load current and any transient currents) and open a switch (e.g. to trip the circuit) based on the measured total current. Some devices may include active spark protection circuits, which respond faster than standard load protection circuits, however such active spark protection circuits also generally measure a total current (including the load current and any transient currents) and open a switch (e.g. to trip the circuit) based on the measured total current. However, transient currents may generally occur over a brief time period as compared to a load current, and may be too brief to cause sparking; hence disabling the battery based on the total current may unnecessarily interrupt usage of any device being powered by a battery that includes such protection circuits.

Figure 1:
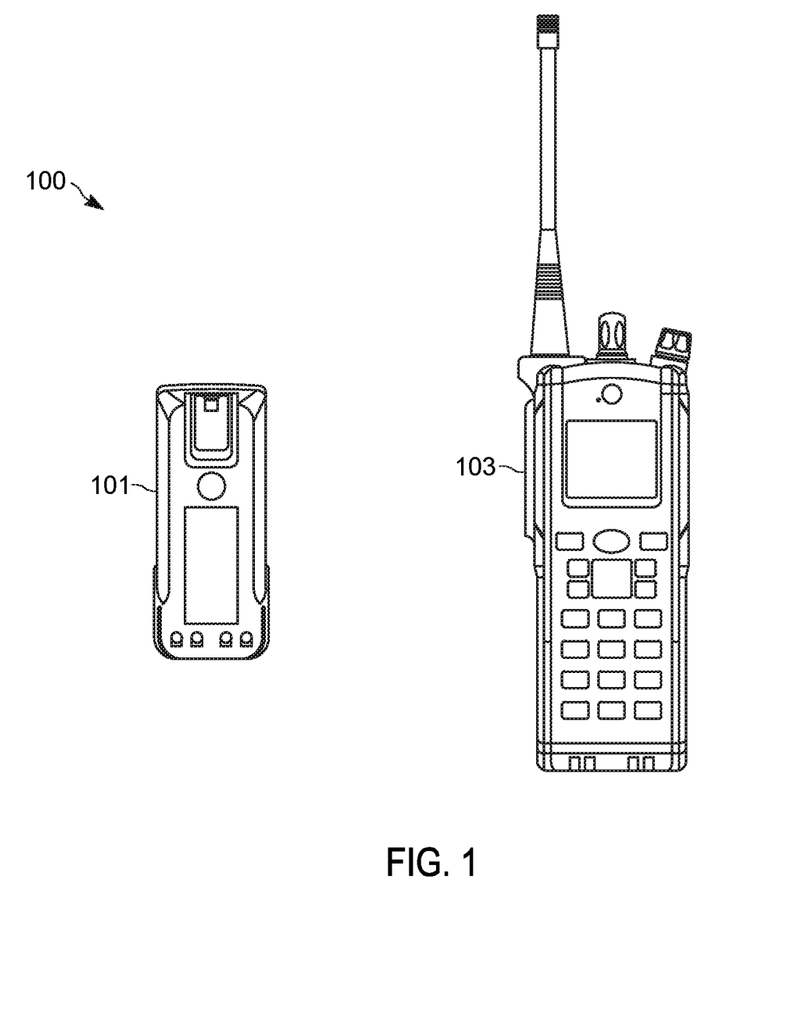
FIG. 1 depicts a device that includes a battery and a battery-powered device, configured for spark detection based on transient currents, in accordance with some examples.

An aspect of the specification provides a battery comprising: a cell; an interface; a first protection circuit comprising a first switch between the cell and the interface, the first protection circuit configured to: measure a load current on the cell; and open the first switch according to a first delay time based on the measurement of the load current; and a second protection circuit comprising a second switch between the cell and the interface, the second protection circuit configured to: measure a transient current on the cell above the load current; and open the second switch according to a second delay time, lower than the first delay time, based on the measurement of the transient current Attention is directed to FIG. 1, which depicts a perspective view of an example device 100 that includes a battery 101 and a battery-powered device 103. The battery-powered device 103 is interchangeably referred to hereafter as the device 103. While as depicted the battery 101 and the device 103 are separate from one another, the battery 101 and the device 103 are generally configured to mate such that the battery 101 powers the device 103, as described in more detail below. However, the battery 101 and the device 103 may be provided and/or sold separate from one another, and/or as a unit as the device 100.

As depicted, the device 103 comprises a hazardous location (HAZLOC) radio, and the battery 101 comprise a HAZLOC battery, each for use in mines and/or other hazardous locations where sparks and the like may cause explosions and the like. As will be described below, the battery 101 is generally adapted for spark detection based on transient currents, when the battery 101 is used with the device 103 and/or another device. Furthermore, the battery 101 may be used with devices other than the device 103. Furthermore, in other examples, the battery 101 and/or the device 103 may be adapted for use in non-hazardous locations. Furthermore, the device 103 may not be a radio, but may be any type of device powered by the battery 101, for use in hazardous locations and/or for use in non-hazardous locations.

Figure 2:
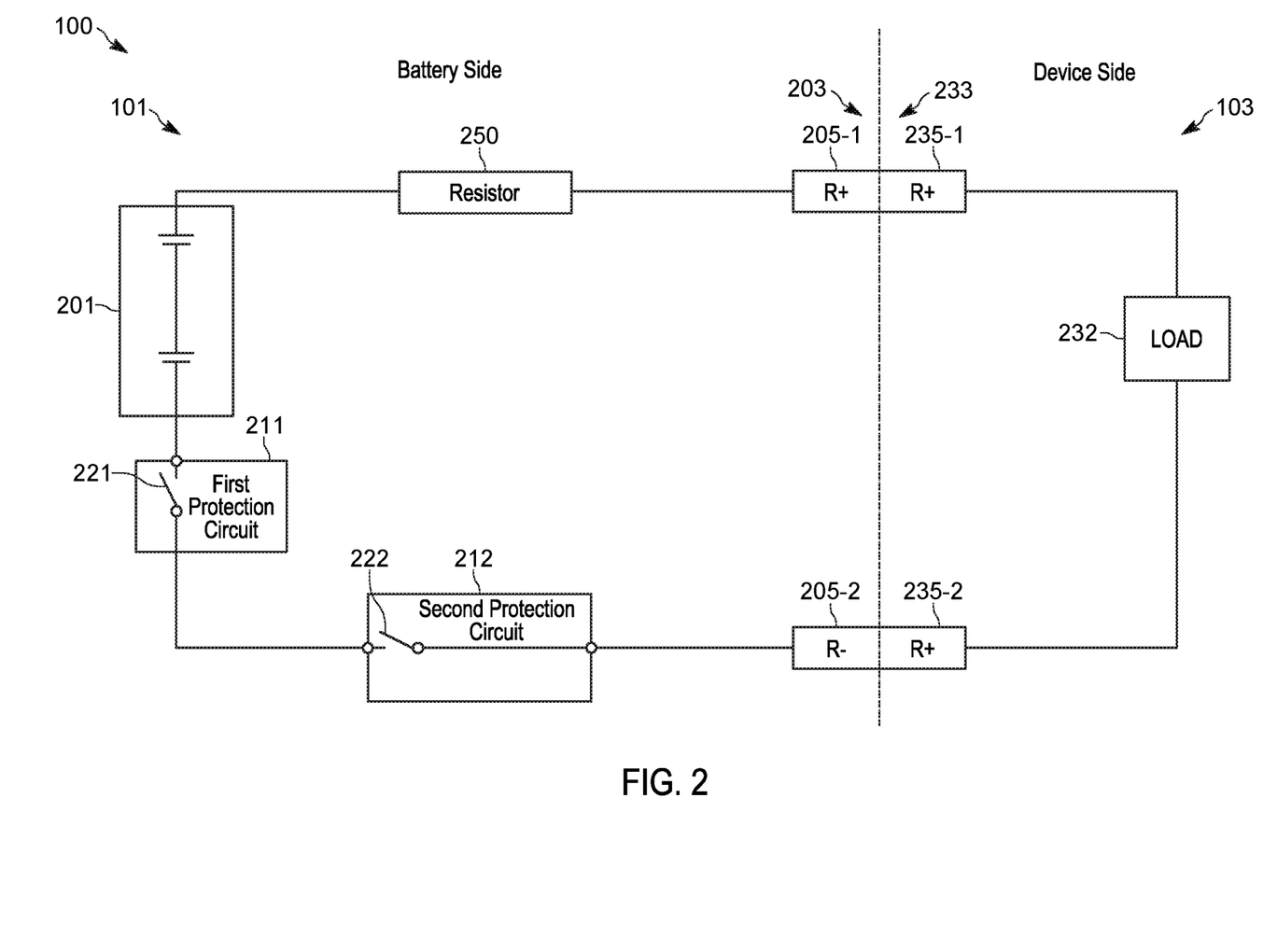
FIG. 2 is a device diagram showing an example structure of the device of FIG. 1, in accordance with some examples.

Attention is next directed to FIG. 2, which depicts a schematic block diagram of the device 100, with the battery 101 mated with the device 103.

As depicted in FIG. 2, the battery 101 comprises: a cell 201; an interface 203 comprising, for example, cell contacts 205-1 (e.g. a "+" contact), 205-2 (e.g. a "−" contact); a first protection circuit 211; and a second protection circuit 212. The first protection circuit 211 comprises a first switch 221 between the cell 201 and the interface 203; and the second protection circuit 212 comprises a second switch 222 between the cell 201 and the interface 203. The cell contacts 205-1, 205-2 are interchangeably referred to hereafter, collectively, as the cell contacts 205 and, generically, as a cell contact 205.

Another aspect of the specification provides a device comprising: a battery; a battery-powered device including a load with a varying current; an interface between the battery and the battery-powered device, the battery comprising: a cell; a first protection circuit comprising a first switch between the cell and the interface, the first protection circuit configured to: measure a load current on the cell due to the load of the battery-powered device; and open the first switch according to a first delay time based on the measurement of the load current; and a second protection circuit comprising a second switch between the cell and the interface, the second protection circuit configured to: measure a transient current on the cell above the load current; and open the second switch according to a second delay time, lower than the first delay time, based on the measurement of the transient current.

Another aspect of the specification provides a method comprising: measuring, using a first protection circuit of a battery, a load current on a cell of the battery; opening, using the first protection circuit, a first switch between the cell and an interface of the battery according to a first delay time based on the measurement of the load current; and measuring, using a second protection circuit of the battery, a transient current on the cell above the load current; and opening, using the second protection circuit, a second switch according to a second delay time, lower than the first delay time, based on the measurement of the transient current.

As will be explained in further detail below, the first protection circuit 211 is configured to: measure a load current (and/or a total current) on the cell 201; and open the first switch 221 according to a first delay time based on the measurement of the load current (and/or the total current). As will also be explained in further detail below, the second protection circuit 212 is configured to: measure a transient current on the cell 201 above the load current; and open the second switch 222 according to a second delay time, lower than the first delay time, based on the measurement of the transient current.

As depicted, the cell 201, the first protection circuit 211, the second protection circuit 212 and the cell 201 are connected in series with the cell contacts 205 of the interface 203. The cell contacts 205 generally provide power from the cell 201 to the device 103, as described below. While the interface 203 is depicted as including only the two cell contacts 205, in other examples, the interface 203 may include more than two cell contacts 205 and/or other types of contacts including, but not limited to, one or more data contacts, for example to communicate data and/or signals between the device 103 and the battery 101.

As depicted, the battery 101 further comprises a fixed resistor 250 connected in series with the first protection circuit 211, the second protection circuit 212, the cell 201 and the cell contacts 205 of the interface 203. The protection circuits 211, 212 generally provide protection against sparking, and the resistor 250, when present, may generally limit the current provided to the device 103 via the cell contacts 205. While the cell 201, the protection circuits 211, 212 and the resistor 250 are depicted in a given order between the cell contacts 205, the depicted components of the battery 101 may be in connected in series in any suitable order between the cell contacts 205.

The cell 201 may comprises a lithium ion cell, however the cell 201 may be any suitable type of cell including, but not limited to, one or more lithium ion cells.

While as depicted, the battery 101 comprises only two protection circuits 211, 212, in some examples the battery 101 may further comprise at least a third protection circuit similar to the second protection circuit 212 to provide redundancy. For example, such a third protection circuit may be connected in series with the first protection circuit 211, the second protection circuit 212, the cell 201, the resistor 250 and the cell contacts 205 of the interface 203. Put another way, the battery 101 may include more than two of the second protection circuits 212, for example connected in series, to provide redundancy.

The device 103 comprises a load 232 with a varying current, for example according to sudden changes, which may temporarily cause a transient current in the device 103 to occur; such a transient current may not be of a duration to cause sparking, but may cause the total current (e.g. the load current and the transient current) to at least temporarily exceed a threshold load current. The load 332 may include switches, transistors, circuits, notification devices, transceivers, and the like and/or any load where current varies and/or where transient currents occur. However, However, transient currents may also occur due to radio-frequency (RF) interference and/or noise.

The device 103 further comprises an interface 233, for example cell contacts 235-1 (e.g. a "+" contact), 235-2 (e.g. a "−" contact). The cell contacts 235-1, 235-2 are interchangeably referred to hereafter, collectively, as the cell contacts 235 and, generically, as a cell contact 235. As depicted, the cell contacts 235 mate with respective cell contacts 205 of the battery 101, for example to provide power to the load 232. While the interface 233 is depicted as including only the two cell contacts 235, in other examples, the interface 233 may include more than two cell contacts 235 and/or other types of contacts including, but not limited to, one or more data contacts, for example to communicate data and/or signals between the device 103 and the battery 101; in general, the interfaces 203, 233 may include contacts in a one-to-one ratio with each other.

In general, the battery 101 provides a load current and/or power to the load 232. A spark may occur across any components of the load 232 and/or between the cell contacts 205 and/or between the cell contacts 235. In general, such a spark may be caused by a sudden but temporary increase in current to the load 232, for example as a transient current over and above a load current. However, according to HAZLOC standards, spark energy may be defined by $e = V_{source} * I_{spark} * T_{trip}$, where $V_{source}$ is a voltage provided to a device by a battery, $I_{spark}$ is a current provided to the device by the battery, for example corresponding to a rapid increase in current, and $T_{trip}$ is a time over which the current occurs. According to HAZLOC standards, an allowed spark energy may be defined, and the spark energy due to transient currents may be less than the allowed spark energy, but when total current is used to determine the spark energy, rather than the transient current, the spark energy may exceed the allowed spark energy, even though the spark energy due to the transient current is less than the allowed spark energy. Hence, for example, turning on a switch at a device may cause a transient current that causes a load protection circuit and/or an active spark protection circuit to trip. Similarly, transient currents due to RF interference and/or noise may cause a load protection circuit and/or an active spark protection circuit to trip.

However, the protection circuits 211, 212 generally protect against increases in both load currents and transient currents (e.g. independent of the load currents) such that neither exceed respective thresholds, but on different time scales. Operation of the protection circuits 211, 212 will next be described in more detail.

The first protection circuit 211 may be configured to open the first switch 221 when the load current (e.g. a total current) is above a threshold load current for the first delay time; in some examples, such a threshold load current may be about 4.68 A, however any suitable threshold load current is within the scope of the present specification. In particular, a threshold load current of 4.68 A may be determined based on spark energy and/or current thresholds for reducing risk of explosive gases combusting in hazardous locations, for example based on a given voltage of the cell 201; and/or a threshold load current of 4.68 A may be defined by a HAZLOC standard.

The first delay time may be in a range of about 2.4 ms to about 16 ms, however any suitable delay time is within the scope of the present specification, and may be selected by selecting combinations of resistors, capacitors and the like of the first protection circuit 211. The first delay time corresponds to the $T_{trip}$ time to determine spark energy for the load current. Hence, the load current (e.g. the total current) would be at and/or exceed the threshold load current for the first delay time to cause the first protection circuit 211 to open the first switch 221. Put another way, the first protection circuit 211 opens the first switch 221 when the load current (e.g. the total current) supplied to the device 103 meets and/or exceeds the threshold load current for the first delay time, which would cause the spark energy to exceed a threshold spark energy. Put yet another way, the first delay time corresponds to a time period for the first protection circuit 211 to respond to changes in the load current; hence the first protection circuit 211 may be generally configured to respond to changes in the load current at a speed commensurate with load current changes, but not commensurate with transient current changes so that sudden transient currents do not cause the first protection circuit 211 to trip.

While the first protection circuit 211 is not described in detail herein, it is understood that the first protection circuit 211 generally opens the first switch 221 (e.g. trips) based on a measured load current (and/or a total current) in the battery 101. The first protection circuit 211 may hence include any suitable circuit (e.g. combinations of resistor(s) and/or capacitor(s), and the like, which measures a load current (and/or a total current) and opens the first switch 221 when the load current is above a threshold load current, according to the first delay time. In some examples, the first switch 221 may comprise a field effect transistor (FET) and or a metal-oxide semiconductor FET (MOSFET).

The second protection circuit 212 may be configured to open the second switch 222 when the transient current is above a threshold transient current for the second delay time; in some examples, such a threshold transient current may be about 4.68 A, however any suitable threshold transient current is within the scope of the present specification. As with the threshold load current, the threshold transient current may be determined based on a threshold spark energy and/or defined by a HAZLOC standard. For example, a threshold transient current of 4.68 A may be the same as the threshold load current of 4.68 A.

The second delay time may be in a range of about 0.5 µs to about 2 µs, however any suitable delay time that is less than the first delay time of the first protection circuit 211 is within the scope of the present specification, and may be selected by selecting combinations of resistors, capacitors and the like of the second protection circuit 212. The second delay time corresponds to the $T_{trip}$ time to determine spark energy for the transient current. Hence, the transient current (e.g. independent of the load current) would be at and/or exceed the threshold transient current for the second delay time to cause the second protection circuit 212 to open the second switch 222. Put another way, the second protection circuit 212 opens the second switch 222 when a transient current (e.g. independent of the load current) drawn by the device 103 meets and/or exceeds the threshold transient current for the second delay time, which would cause the spark energy to exceed a threshold spark energy. Put yet another way, the second delay time corresponds to a time period for the second protection circuit 212 to respond to changes in the transient current; hence the second protection circuit 212 may be generally configured to respond to changes in the transient current at a speed commensurate with transient currents.

The second protection circuit 212 may hence include any suitable circuit (e.g. combinations of resistor(s) and/or capacitor(s), and the like), which measures a transient current and opens the second switch 222 when the transient current is above a threshold transient current, according to the second delay time. In some examples, the second switch 222 may comprise a field effect transistor (FET) and or a metal-oxide semiconductor FET (MOSFET).

In some examples, as described herein, the first delay time of the first protection circuit 211 is in a millisecond range (e.g. about 2.4 ms to about 16 ms), and the second delay time of the second protection circuit 212 is in a microsecond range (e.g. about 0.5 µs to about 2 µs). Put another way, the first delay time may be about 1000 times larger than the second delay time, and/or the second protection circuit 212 is about 1000 faster than the first protection circuit 211. An example of the second protection circuit 212 will be described in more detail with respect to FIG. 3.

Hence, in general, the second protection circuit 212 may be 1000 times more responsive and/or faster than the first protection circuit 211. This may lead to various operating modes in the battery 101 as described hereafter. In each mode described hereafter, it is understood that the battery 101 is providing current and/or power to the device 103 and that both the switches 221, 222 are closed, which may be a normal operating state of the device 103.

In one mode, the transient current does not exceed the threshold transient current for the second time delay, and the load current does not exceed the threshold load current for the first time delay. In this mode, the second protection circuit 212 does not open the second switch 222 as the transient current does not exceed the threshold transient current for the second time delay, and the first protection circuit 211 does not open the first switch 221 as the load current does not exceed the threshold load current for the first time delay. This may be an example of a normal operating mode of the battery 101.

In another mode, the load current does not exceed the threshold load current, but the transient current exceeds the threshold transient current for the second time delay (e.g. the transient current is relatively high frequency as compared to the load current), which may hence be indicative of a spark and/or which may be indicative of a condition under which a spark may occur. In this mode, the second protection circuit 212 may open the second switch 222 when the transient current exceeds the threshold transient current for the second time delay. Hence, in this mode, regardless of the load current, the battery 101 at least temporarily stops supplying current and/or power to the device 103. However, the second protection circuit 212 may close the second switch 222 when the transient current falls below the threshold transient current (e.g. for the second delay time).

In yet another mode, the transient current does not exceed the threshold transient current for the second time delay (e.g. the transient current is a relatively low frequency and/or a relative low current), and the load current does exceed the threshold load current for the first time delay; in this mode, the transient current may contributes to the load current and/or the total current as measured by the first protection circuit 211 when the transient current is persistent and/or on time scale commensurate with the first time delay. Furthermore, the load current and/or the total current exceeding the threshold load current for the first time delay may be indicative of a spark and/or may be indicative of a condition under which a spark may occur. In this mode, the second protection circuit 212 does not open the second switch 222 when the transient current does not exceed the threshold transient current for the second time delay, and the first protection circuit 211 opens the first switch 221 when the load current exceeds the threshold load current for the first time delay. However, the first protection circuit 211 may close the first switch 221 when the load current falls below the threshold load current for the first time delay.

In all of these modes, the second protection circuit 212 may respond 1000 faster than the first protection circuit 211 and hence protect the device 100 against sudden transient currents that persist for the second delay time and may be indicative of sparks and/or represent conditions that may lead to sparks. However, transient currents that occur for a time shorter than the second delay time are not indicative of sparks and/or do not represent conditions that may lead to sparks. Indeed, transient currents that occur for a time shorter than the second delay time do not generally cause the second protection circuit 212 to open the second switch 222. Indeed, the second protection circuit 212 may not detect such transient currents.

Figure 3:
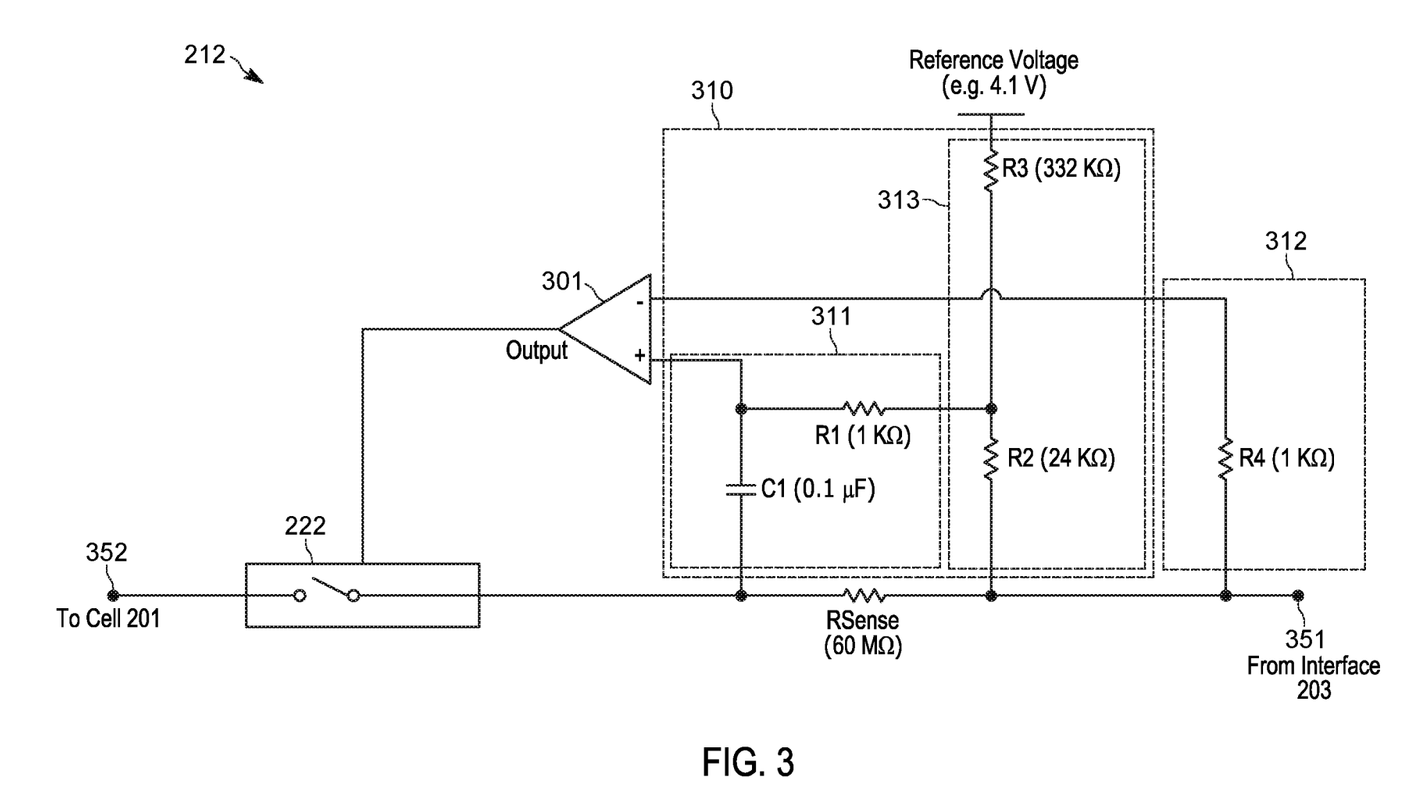
FIG. 3 is a device diagram showing an example structure of a second battery protection circuit of the battery of the device as shown in FIG. 2, in accordance with some examples.

Attention is next directed to FIG. 3 which depicts a schematic diagram of an example of the second protection circuit 212. As depicted, the second protection circuit 212 comprises: the second switch 222 (e.g. FET and/or a MOSFET); a comparator 301 (e.g. having a positive ("+") input and a negative ("−") input); a floating reference voltage circuit 310 configured to filter out voltages that occur according to the second delay time due to a transient current, thereby outputting a filtered voltage to the comparator 301 (e.g. to the positive input) that indicates the load current (as depicted the floating reference voltage circuit 310 comprises a low pass filter 311 configured to filter out voltages that occur according to the second delay time due to a transient current); and a current monitor circuit 312 configured to output a measured voltage to the comparator 301 (e.g. to the negative input) that indicates a combination of the load current and the transient current.

The comparator 301 may comprise an integrated circuit, and may be generally configured to: compare the filtered voltage and the measured voltage to measure a difference therebetween indicative of the transient current; and when the difference exceeds a threshold value, open the second switch 222. For example, and output of the comparator 301 may be to a gate of a FET of the second switch 222 and may open and close the second switch 222 by controlling a voltage to the gate, based on a difference between the positive and negative input of the comparator 301. The second delay time of the second protection circuit 212 may be defined by a propagation delay time of the comparator 301 (e.g. time for the comparator 301 to determine a difference between the positive and negative input and responsively control the second switch 222 to open), plus an open delay time of the switch 222 (e.g. a time for the second switch 222 to open), which may be in a range of about 0.5 µs to about 2 µs.

As depicted, a sensing resistor RSense (e.g. 60 MΩ) is in series with an input 351 to the second protection circuit 212 (e.g. from the interface 203 and/or a cell contact 205), the switch 222 and an output 352 of the second protection circuit 212. Hence, a voltage across the sensing resistor RSense is indicative of a total current in the battery 101 (e.g. including a load current and transient currents).

As depicted, the low pass filter 311, of the floating reference voltage circuit 310, is between the interface 203 and a respective input (e.g. the positive input) to the comparator 301; as depicted, the low pass filter 311 comprises a resistor-capacitor (RC) circuit. The low pass filter 311 comprises a first resistor R1 (e.g., as depicted, 1 kΩ), and a capacitor C1 (e.g., as depicted, 0.1 µF) connected across the sensing resistor RSense and to the positive input to the comparator 301. The combination of the first resistor R1 and the capacitor C1 filter out voltages detected across the sensing resistor RSense due to transient currents for example transient currents that occur for the second time delay. Hence, a voltage at the positive input to the comparator 301 represents voltage due to load current only, and not transient currents.

The floating reference voltage circuit 310 further comprises a divider circuit 313 that includes a connection to a reference voltage (e.g. 4.1 V). The divider circuit 313 comprises a second resistor R2 and a third resistor R3 (e.g., as depicted, 24 kΩ and 332 kΩ, respectively). The reference voltage may be provided from the cell 201 via any suitable connection to the cell 201 (e.g. the suitable connection including any suitable circuit and/or combination of resistors and the like).

The second resistor R2 and the third resistor R3 are connected in series to the reference voltage, and the second resistor R2 is connected to the input 351 between the sensing resistor RSense and the input 351. The first resistor R1 connects between the third resistor R3 and the second resistor R2 to the positive input of the comparator 301. The capacitor C1 connects the sensing resistor RSense (on a side opposite the input 351) to the positive input of the comparator 301. In general, the capacitor C1 and the second resistor R2 are connected in parallel, and the sensing resistor RSense and the first resistor R1 are connected in parallel.

In general, the low pass filter 311 filters out voltages due to high frequency transient currents from the interface 203 (using the reference voltage as a reference), and the values of the capacitor C1, and the first resistor R1 are selected such that the low pass filter 311 has a sufficient time constant to hold (or maintain) the voltage at the positive input of the comparator 301 while the transient current is occurring. Hence, the time constant of the low pass filter 311 may be selected accordingly, and/or to select a length of a transient current to be measured by the second protection circuit 212.

In general, the floating reference voltage circuit 310 comprises the low pass filter 311 and the divider circuit 313. A voltage measured by the floating reference voltage circuit 310 is generally floating and is due to a load current flowing through the sensing resistor Rsense, which may change depending on the changes in the voltage at the input 351, and resulting changes of a divider voltage between the second resistor R2 and the third resistor R3 (e.g. which affects the voltage across the first resistor R1 with respect to the positive input of the comparator 301). A floating reference voltage, $V_{ref\_float}$, may hence be expressed as: $V_{ref\_float} = V_{Rsense} + V_{R1}$, where $V_{Rsense}$ is the voltage across the sensing resistor Rsense, and $V_{R1}$ is the voltage across the first resistor R1. In particular, when a higher load current flows through the resistor Rsense, the floating reference voltage, $V_{ref\_float}$, increases.

While a specific floating reference voltage circuit 310 is depicted in FIG. 3, it is understood that the second circuit 212 may comprise any suitable circuit configured to filter out voltages that occur according to the second delay time due to the transient current thereby outputting a filtered voltage to the comparator that indicates the load current. In other words, any suitable floating reference voltage circuit is within the scope of the present specification.

As depicted, the current monitor circuit 312 comprises at least one resistor, for example, as depicted, a fourth resistor R4 (e.g., as depicted, 1 kΩ), between the interface 203 and/or the input 351, and a respective input (e.g. the negative input) to the comparator 301. The voltage measured by the current monitor circuit 312 is due to both a load current and any transient currents that may occur, regardless of frequency. The fourth resistor R4 is hence also connected to the input 351. The value of the fourth resistor R4 is selected to be compatible with the values of the capacitor C1 and the resistors RSense, R3, R1, R2 such that a difference in voltage between the positive and negative inputs of the comparator 301 is due to sudden, high frequency transient currents that occur according to the second time delay, and the difference in voltage between the positive and negative inputs of the comparator 301 further represents a magnitude of the transient current. The comparator 301 may hence be configured to compare the difference in voltage between the positive and negative inputs of the comparator 301 to a voltage representative of the threshold transient current and open and close the second switch 222 accordingly.

In other words, a voltage at the negative input of the comparator 301 indicates a total voltage (e.g. a voltage due to the combination of the load current and the transient current) being provided to the device 103, and a voltage at the positive input of the comparator 301 indicates a filtered voltage due to the load current with transient currents filtered out.

Figure 4:
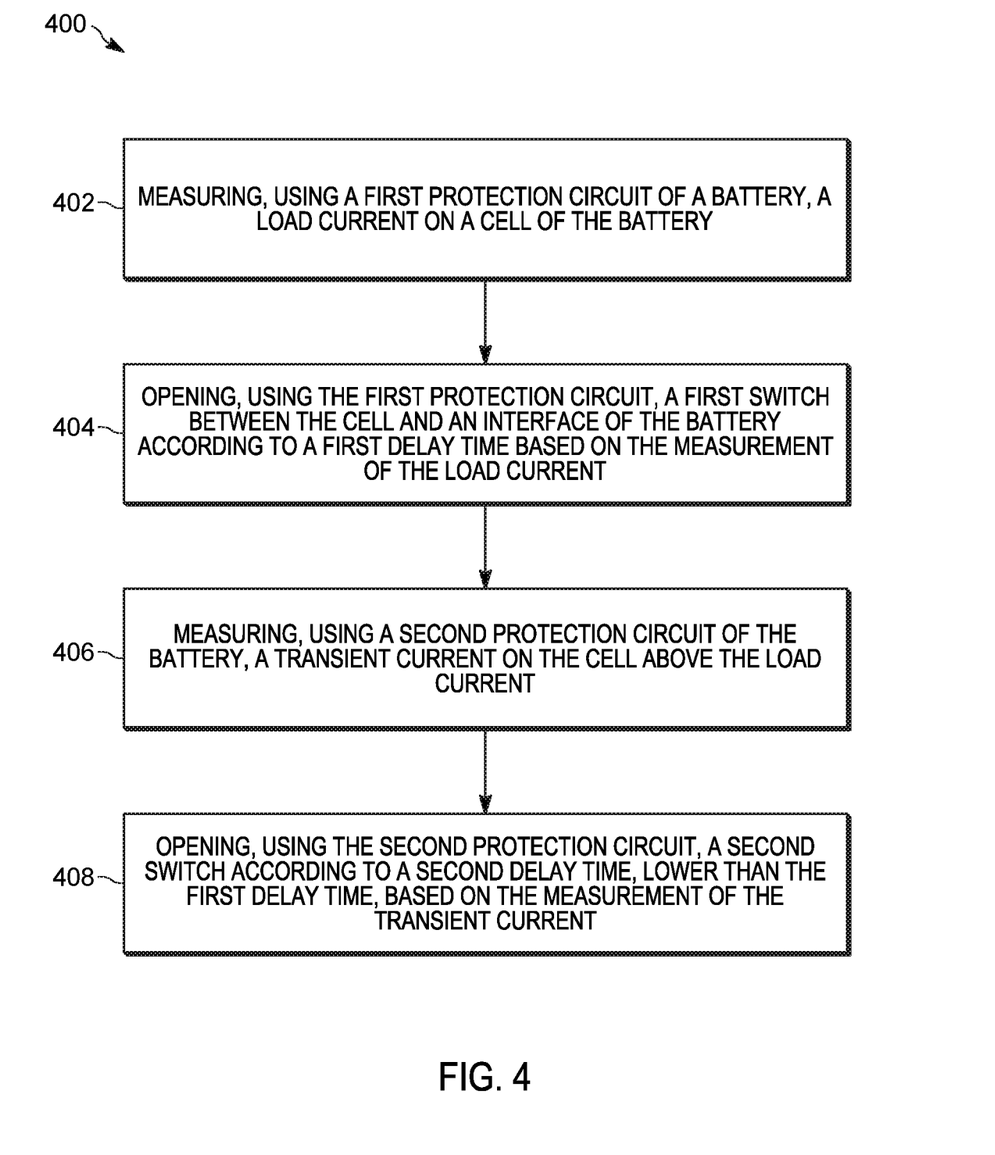
FIG. 4 is a block diagram of a method for spark detection based on transient currents, in accordance with some examples.

Attention is next directed to FIG. 4 which a block diagram of a method 400 for spark detection based on transient currents that may be implemented in the example battery 101 using the protection circuits 211, 212. Furthermore, the following discussion of the method 400 of FIG. 4 will lead to a further understanding of the device 100 and/or the battery 101, and their various components. The method 400 need not be performed in the exact sequence as shown and likewise various blocks may be performed in parallel rather than in sequence. Accordingly, the elements of method 400 are referred to herein as "blocks" rather than "steps." The method 400 may be implemented on variations of the device 100 and/or the battery 101, as well.

A block 402 comprises measuring, using the first protection circuit 211 of the battery 101, a load current on the cell 201 of the battery 101.

A block 404 comprises opening, using the first protection circuit 211, the first switch 221 between the cell 201 and the interface 203 of the battery 101 according to a first delay time based on the measurement of the load current, as measured at the block 402.

While not depicted, the method 400 may further comprise: opening, using the first protection circuit 211, the first switch 221 between the cell 201 and the interface 203 of the battery 101 when the load current exceeds a threshold load current for the first delay time. Similarly, the method 400 may further comprise: closing, using the first protection circuit 211, the first switch 221 between the cell 201 and the interface 203 of the battery 101 when the load current does not exceed the threshold load current for the first delay time. Similarly, the method 400 may further comprise: closing, using the first protection circuit 211, the first switch 221 between the cell 201 and the interface 203 of the battery 101 when the load current exceeds the threshold load current for less than the first delay time.

A block 406 comprises measuring, using the second protection circuit 212 of the battery 101, a transient current on the cell 201 above the load current.

A block 408 comprises opening, using the second protection circuit 212, the second switch 222 according to a second delay time, lower than the first delay time, based on the measurement of the transient current, as measured at the block 406.

While not depicted, the method 400 may further comprise: opening, using the second protection circuit 212, the second switch 222 between the cell 201 and the interface 203 of the battery 101 when the transient current exceeds a threshold transient current for the second delay time. Similarly, the method 400 may further comprise: closing, using the second protection circuit 212, the second switch 222 between the cell 201 and the interface 203 of the battery 101 when the transient current does not exceed the threshold transient current for the second delay time. Similarly, the method 400 may further comprise: closing, using the second protection circuit 212, the second switch 222 between the cell 201 and the interface 203 of the battery 101 when the transient current exceeds the threshold transient current for less than the second delay time.

The blocks 402, 404, and the block 406, 408 may occur in parallel with each other. Furthermore, the blocks 406, 408 may be implemented faster than the blocks 402, 404.

Attention is next directed to FIG. 5 which depicts a graph 500 showing an example of a load current 501 (that does not include transient current) in the battery 101 that varies over time and specifically increases (the load current 501 also indicated on the graph 500 as "$I_{load}$") to just below a threshold load current (e.g. Threshold $I_{load}$ of 4.68 A). While not depicted, when the load current 501 increases to be above the Threshold $I_{load}$, the first protection circuit 211 opens the first switch 221.

Figure 5:
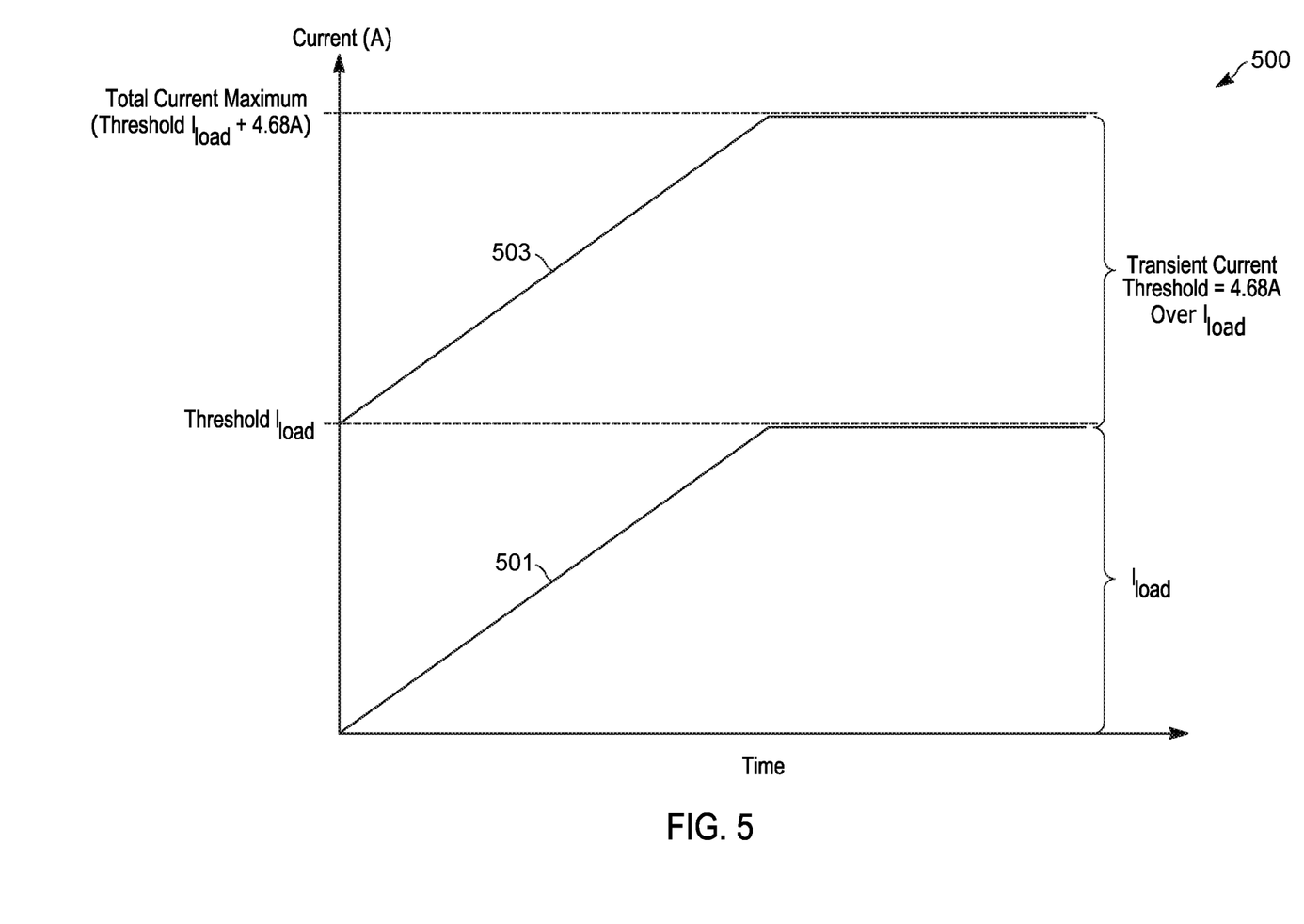
FIG. 5 is a graph showing an example of peak transient peak currents that may occur over time, as compared to an increasing load current, in accordance with some examples.

FIG. 5 also depicts how a total "allowed" current 503 due to transient currents over the load current 501 varies with the load current 501. For example, when a transient current threshold is at 4.68 A, a total "allowed" current 503 is 4.68 A over the load current 501. When the total "allowed" current 503 due a transient current occurs for the second time delay, the second protection circuit opens the second switch 222. However, the total "allowed" current 503 may occur for time periods less than the second time delay without either protection circuit 211, 212 tripping.

Also depicted in FIG. 5 is a total "allowed" current maximum, which is the transient current threshold (e.g. 4.68 A) added to the load current threshold Load. Hence, the total "allowed" current maximum increases by 4.68 A as compared to prior art devices where load protection circuits may trip at 4.68 A regardless of whether an increase in current is due to an increase in load current or due to a transient current.

Figure 6:
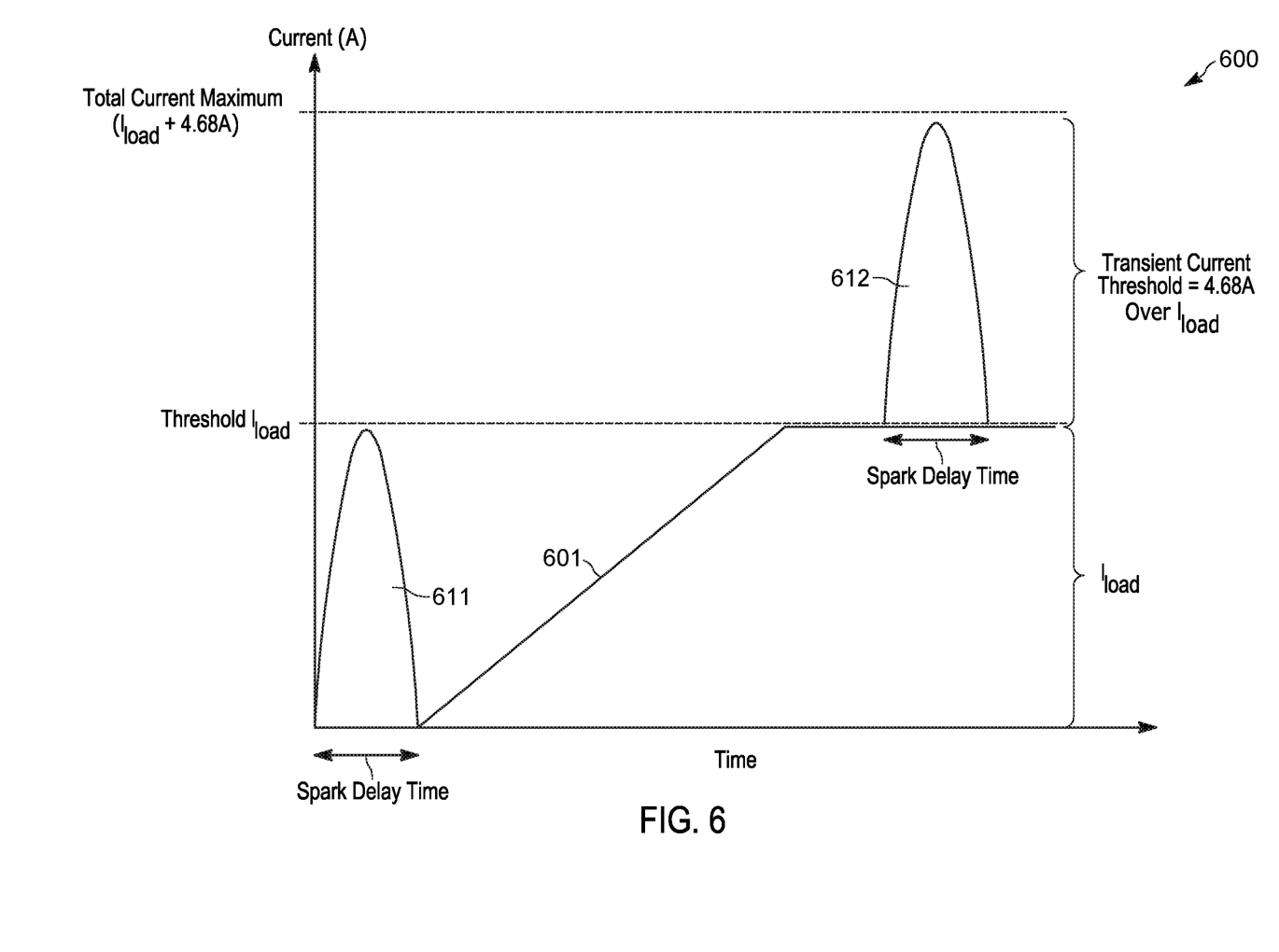
FIG. 6 is a graph showing an example of sparking in the device of FIG. 1, in accordance with some examples.

Attention is next directed to FIG. 6 which depicts a graph 600 of example transient currents and load currents in the battery 101. Specifically, the graph 600 depicts a load current 601 ramping up from "0" to just below a threshold load current (e.g. Threshold $I_{load}$) over time. When the load current 601 is "0" (e.g. no load) and when the load current 601 is about maximum (e.g. just below the threshold load current and/or a full load), respective transient currents 611, 612 occur for example due to a switches being activated in the device 103. In the example of FIG. 6, the transient currents 611, 612 are understood to be just below the threshold transient current and having a "spark delay time" of: less than the first delay time so that the first protection circuit 211 does not open the first switch 221; about the second delay time so that the second protection circuit 212 may open the second switch 222 when the transient currents exceed the threshold transient current. Furthermore, each of the transient currents 611, 612 is understood to have a same and/or similar spark energy.

However, the neither protection circuit 211, 212 trips when the transient current 612, over and above the load current 501 does not exceed the threshold transient current. In other words, a short transient current spikes in current may occur in the battery 101 without the protection circuits 211, 212 tripping (e.g. the switches 221, 222 are not opened).

Figure 7:
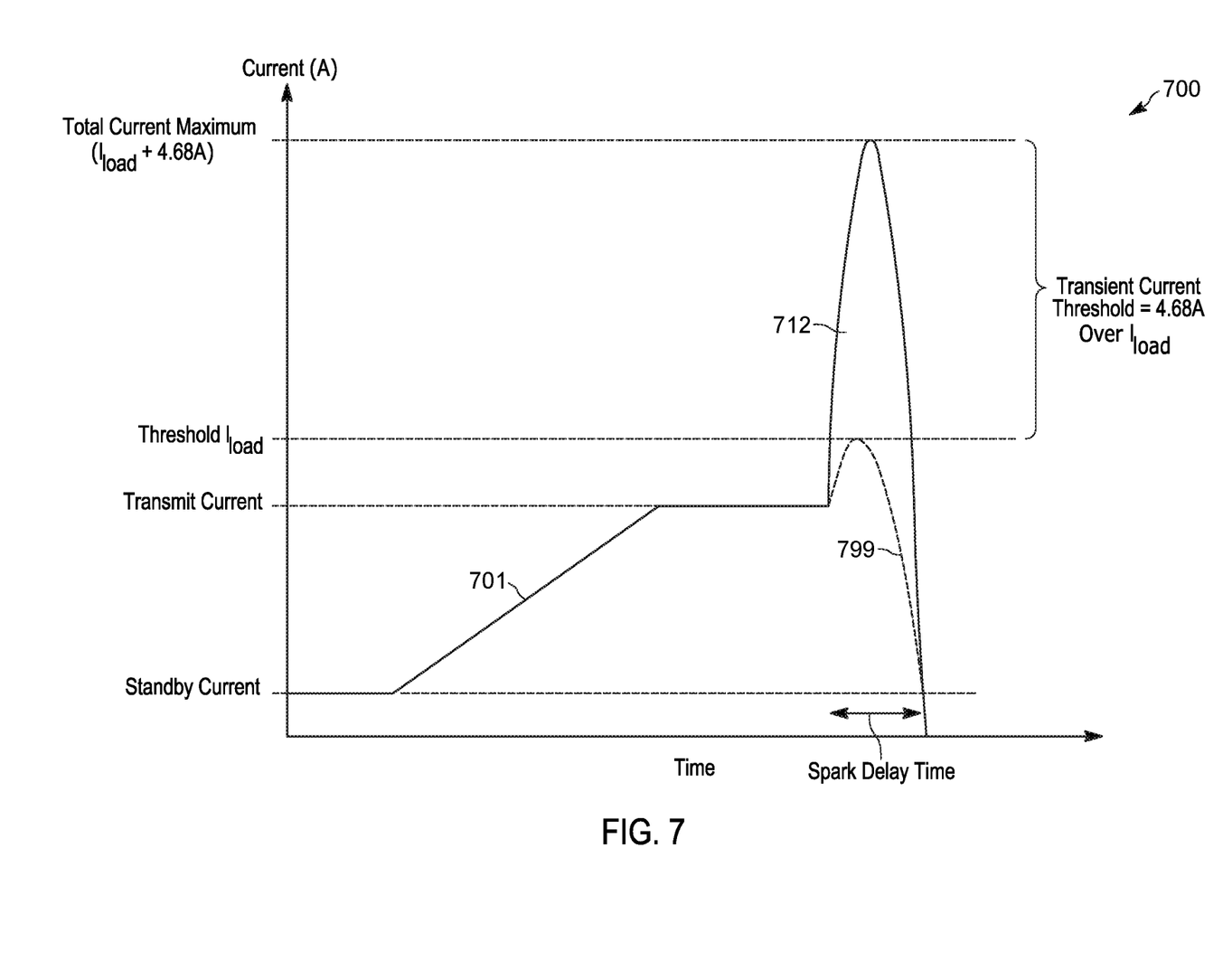
FIG. 7 is a graph showing an example of current vs. time when the device of FIG. 1 comprises a radio, as compared with a prior art device, in accordance with some examples.

Attention is next directed to FIG. 7 which depicts a graph 700 of current vs. time when the device 103 comprises a radio device powered by the battery 101. In particular, the graph 700 shows that a load current 701 may ramp from a standby current to a transmit current (e.g. a current used to transmit radio signals) that is below the threshold load current (e.g. Threshold NA, for example of 4.68V). However, after some time, a transient current 712 occurs for a spark delay time of about the second delay time of the second protection circuit 212. The transient current 712 may be due to activation of a switch, RF interference, noise, and the like at the device 103.

As depicted in FIG. 7, the transient current 712 exceeds the transient current threshold for the second delay time and hence the second protection circuit 212 opens the second switch 222 which causes the total current to fall to "zero". However, when the transient current 712 does not exceeds the transient current threshold, the second protection circuit 212 does not open the second switch 222.

However, also depicted in FIG. 7 is the behavior of a current 799 due to a transient current that would occur in the device 100 if powered by a prior art battery with a load protection circuit that does not distinguish between a load current and a transient current. As depicted, when the current 799 reaches the threshold load current (e.g. Threshold $I_{load}$), the current 799 falls to "zero". Hence, the transient current 712 of the present example has a larger margin (e.g. 4.68 A above the load current 701) for causing second protection circuit 212 of the battery 101 to trip as compared to the current 799 of a prior art device.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A battery comprising:
a cell;
an interface;
a first protection circuit comprising a first switch between the cell and the interface, the first protection circuit configured to:
measure a load current on the cell; and
open the first switch according to a first delay time based on the measurement of the load current; and
a second protection circuit comprising a second switch between the cell and the interface, the second protection circuit configured to:
measure a transient current on the cell above the load current; and
open the second switch according to a second delay time, lower than the first delay time, based on the measurement of the transient current,
wherein the second protection circuit comprises:
a comparator;
a floating reference voltage circuit configured to filter out voltages that occur according to the second delay time due to the transient current thereby outputting a filtered voltage to the comparator that indicates the load current; and
a current monitor circuit configured to output a measured voltage to the comparator that indicates a combination of the load current and the transient current;
the comparator configured to:
compare the filtered voltage and the measured voltage to measure a difference therebetween indicative of the transient current; and
when the difference exceeds a threshold value, open the second switch.

2. The battery of claim 1, wherein the floating reference voltage circuit comprises a low pass filter between the interface and a respective input to the comparator.

3. The battery of claim 1, wherein the current monitor circuit comprises at least one resistor between the interface and a respective input to the comparator.

4. The battery of claim 1, wherein the second switch comprises a field-effect transistor.

5. The battery of claim 1, wherein the first delay time is in a millisecond range, and the second delay time is in a microsecond range.

6. The battery of claim 1, wherein the first delay time is about 1000 times larger than the second delay time.

7. The battery of claim 1, wherein the first protection circuit, the second protection circuit and the cell are connected in series with cell contacts of the interface.

8. The battery of claim 1, further comprising a fixed resistor connected in series with the first protection circuit, the second protection circuit, the cell and cell contacts of the interface.

9. A device comprising:
a battery;
a battery-powered device including a load with a varying current;
an interface between the battery and the battery-powered device,
the battery comprising:
a cell;
a first protection circuit comprising a first switch between the cell and the interface, the first protection circuit configured to:
measure a load current on the cell due to the load of the battery-powered device; and
open the first switch according to a first delay time based on the measurement of the load current; and
a second protection circuit comprising a second switch between the cell and the interface, the second protection circuit configured to:
measure a transient current on the cell above the load current; and
open the second switch according to a second delay time, lower than the first delay time, based on the measurement of the transient current,
wherein the second protection circuit comprises:
a comparator;
a floating reference voltage circuit configured to filter out voltages that occur according to the second delay time due to the transient current thereby outputting a filtered voltage to the comparator that indicates the load current; and
a current monitor circuit configured to output a measured voltage to the comparator that indicates a combination of the load current and the transient current;
the comparator configured to:
compare the filtered voltage and the measured voltage to measure a difference therebetween indicative of the transient current; and
when the difference exceeds a threshold value, open the second switch.

10. The device of claim 9, wherein the floating reference voltage circuit comprises a low pass filter between the interface and a respective input to the comparator.

11. The device of claim 9, wherein the current monitor circuit comprises at least one resistor between the interface and a respective input to the comparator.

12. The device of claim 9, wherein the second switch comprises a field-effect transistor.

13. The device of claim 9, wherein the first delay time is in a millisecond range, and the second delay time is in a microsecond range.

14. The device of claim 9, wherein the first delay time is about 1000 times larger than the second delay time.

15. The device of claim 9, wherein the first protection circuit, the second protection circuit and the cell are connected in series with the cell contacts of the interface.

16. A method comprising:
- measuring, using a first protection circuit of a battery, a load current on a cell of the battery;
- opening, using the first protection circuit, a first switch between the cell and an interface of the battery according to a first delay time based on the measurement of the load current; and
- measuring, using a second protection circuit of the battery, a transient current on the cell above the load current; and
- opening, using the second protection circuit, a second switch according to a second delay time, lower than the first delay time, based on the measurement of the transient current by:
  - at a floating reference voltage circuit of the second protection circuit, filtering out voltages that occur according to the second delay time due to the transient current thereby outputting a filtered voltage, to a comparator of the second protection circuit, that indicates the load current;
  - at a current monitor circuit of the second protection circuit, outputting a measured voltage to the comparator that indicates a combination of the load current and the transient current; and
  - at the comparator: comparing the filtered voltage and the measured voltage to measure a difference therebetween indicative of the transient current; and, when the difference exceeds a threshold value, opening the second switch.

* * * * *